(12) United States Patent
Ishikawa et al.

(10) Patent No.: US 11,752,728 B2
(45) Date of Patent: Sep. 12, 2023

(54) LAMINATED SUBSTRATE USING FIBER-REINFORCED THERMOPLASTIC PLASTIC, AND MOLDED PRODUCT MANUFACTURING METHOD USING SAME

(71) Applicant: Mitsubishi Chemical Corporation, Tokyo (JP)

(72) Inventors: Takeshi Ishikawa, Toyohashi (JP); Hayato Ogasawara, Toyohashi (JP); Masao Tomioka, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 373 days.

(21) Appl. No.: 17/159,118

(22) Filed: Jan. 26, 2021

(65) Prior Publication Data

US 2021/0146653 A1 May 20, 2021

Related U.S. Application Data

(63) Continuation of application No. 15/039,449, filed as application No. PCT/JP2014/082242 on Dec. 5, 2014, now Pat. No. 10,919,259.

(30) Foreign Application Priority Data

Dec. 6, 2013 (JP) ................................ 2013-252980

(51) Int. Cl.
*B29C 70/08* (2006.01)
*B32B 37/06* (2006.01)
(Continued)

(52) U.S. Cl.
CPC ............ *B32B 5/022* (2013.01); *B29C 70/081* (2013.01); *B29C 70/083* (2013.01); *B32B 5/18* (2013.01);
(Continued)

(58) Field of Classification Search
CPC ... B29C 70/081; B29C 70/083; B29C 70/085; B29C 70/10; B29C 70/12; B29C 70/14;
(Continued)

(56) References Cited

U.S. PATENT DOCUMENTS 3,713,962 A * 1/1973 Ackley .................... D04H 1/00
442/388
4,044,188 A * 8/1977 Segal ...................... B32B 27/34
264/108
(Continued)

FOREIGN PATENT DOCUMENTS

EP 0637510 A1 2/1995
EP 1927618 A1 6/2008
(Continued)

OTHER PUBLICATIONS

Office Action issued in corresponding European Patent Application No. 14867423.7 dated Apr. 17, 2020.
(Continued)

*Primary Examiner* — Michael A Tolin
(74) *Attorney, Agent, or Firm* — Morgan, Lewis & Bockius LLP

(57) ABSTRACT

Provided is a laminated substrate wherein a sheet-shaped material with a porosity of 50-99% is laminated onto at least one surface of a prepreg substrate which includes a reinforcing fiber and a thermoplastic resin.

17 Claims, 2 Drawing Sheets

(51) Int. Cl.
 B32B 5/02 (2006.01)
 B32B 5/18 (2006.01)
 B29C 70/46 (2006.01)
 B32B 5/24 (2006.01)
 C08J 5/24 (2006.01)

(52) U.S. Cl.
 CPC ............... *B32B 5/24* (2013.01); *B32B 37/06* (2013.01); *C08J 5/243* (2021.05); *C08J 5/244* (2021.05); *B32B 2260/021* (2013.01); *B32B 2260/046* (2013.01); *B32B 2305/076* (2013.01); *B32B 2605/00* (2013.01); *B32B 2605/18* (2013.01); *C08J 2300/22* (2013.01); *Y10T 156/1044* (2015.01)

(58) Field of Classification Search
 CPC ......... B29C 70/16; B29C 70/18; B29C 70/20; B29C 70/202; B29C 70/205; B29C 70/207; B29C 70/22; B29C 70/222; B29C 70/228; B29C 70/40; B29C 70/42; B29C 70/46; B29C 70/465; B29C 70/467; B32B 3/26; B32B 5/022; B32B 5/08; B32B 5/18; B32B 5/24; B32B 5/245; B32B 5/26; B32B 7/12; B32B 37/06; B32B 2250/03; B32B 2250/44; B32B 2260/021; B32B 2260/023; B32B 2260/046; B32B 2262/0253; B32B 2262/0261; B32B 2262/0269; B32B 2262/0276; B32B 2262/065; B32B 2262/10; B32B 2262/101; B32B 2262/103; B32B 2262/106; B32B 2262/14; B32B 2266/0214; B32B 2266/0228; B32B 2266/0242; B32B 2266/025; B32B 2266/0257; B32B 2266/0264; B32B 2305/076; B32B 2307/304; B32B 2307/708; B32B 2307/718; B32B 2307/732; B32B 2605/00; B32B 2605/08; B32B 2605/18; C08J 5/243; C08J 5/244; C08J 2300/22; Y10T 156/1044
 See application file for complete search history.

(56) References Cited

U.S. PATENT DOCUMENTS

| | | | |
|---|---|---|---|
| 4,770,929 A | 9/1988 | Nobumasa | |
| 4,964,935 A * | 10/1990 | Biggs | B29C 43/003 428/113 |
| 5,164,255 A * | 11/1992 | Weeks | D04H 13/00 428/401 |
| 5,288,547 A | 2/1994 | Elmes | |
| 7,445,836 B2 * | 11/2008 | Yamane | B29C 70/46 428/297.4 |
| 2007/0207692 A1 | 9/2007 | Ono et al. | |
| 2010/0028593 A1 | 2/2010 | Taketa | |
| 2011/0143110 A1 | 6/2011 | Tsuhiya | |
| 2012/0114899 A1 | 5/2012 | Ellis | |
| 2013/0105200 A1 | 5/2013 | Ohigashi | |
| 2014/0077412 A1 | 3/2014 | Taniguchi | |
| 2014/0303306 A1 | 10/2014 | Kajiwara | |

FOREIGN PATENT DOCUMENTS

| | | |
|---|---|---|
| EP | 2716433 A1 | 4/2014 |
| GB | 2 455 045 A | 6/2009 |
| JP | 05-293920 A | 11/1992 |
| JP | 05-293841 A | 11/1993 |
| JP | 05-293843 A | 11/1993 |
| JP | 07-097465 A | 4/1995 |
| JP | 07-156172 A | 6/1995 |
| JP | 07-164439 A | 6/1995 |
| JP | 07-314467 A | 12/1995 |
| JP | 09-155862 A | 6/1997 |
| JP | 2003-080519 A | 3/2003 |
| JP | 2013-049150 A | 3/2003 |
| JP | 2007-146151 A | 6/2007 |
| JP | 3977565 B | 9/2007 |
| JP | 4121833 B | 7/2008 |
| JP | 2008-194761 A | 8/2008 |
| JP | 4242644 B | 3/2009 |
| JP | 2010-235779 A | 10/2010 |
| JP | 2011-066600 A | 3/2011 |
| JP | 2012-192645 A | 10/2012 |
| JP | 2015-502271 A | 1/2015 |
| WO | 2005/105435 A1 | 11/2005 |
| WO | 2012/165418 A1 | 12/2012 |
| WO | 2013/062642 A1 | 5/2013 |

OTHER PUBLICATIONS

Office Action issued in corresponding Indian Patent Application No. 201647018186, dated Apr. 5, 2019.
Extended European Search Report dated Oct. 5, 2016 for corresponding European Patent Application No. 14867423.7.
International Search Report dated Mar. 10, 2015, for International Application No. PCT/JP2014/082242.
Office Action dated Aug. 18, 2015, for corresponding Japanese Patent Application No. JP2014-561204.
Restriction Requirement issued in U.S. Appl. No. 15/039,449 dated Sep. 8, 2017.
Office Action issued in U.S. Appl. No. 15/039,449 dated Jan. 5, 2018.
Interview Summary issued in U.S. Appl. No. 15/039,449 dated May 22, 2018.
Final Office Action issued in U.S. Appl. No. 15/039,449 dated Sep. 6, 2018.
Office Action issued in U.S. Appl. No. 15/039,449 dated Mar. 19, 2019.
Final Office Action issued in U.S. Appl. No. 15/039,449 dated Sep. 18, 2019.
Office Action issued in U.S. Appl. No. 15/039,449 dated Jan. 7, 2020.
Final Office Action issued in U.S. Appl. No. 15/039,449 dated May 21, 2020.

* cited by examiner

LAMINATED SUBSTRATE USING FIBER-REINFORCED THERMOPLASTIC PLASTIC, AND MOLDED PRODUCT MANUFACTURING METHOD USING SAME

RELATED APPLICATION DATA

This application is a continuation of U.S. patent application Ser. No. 15/039,449, filed May 26, 2016, now U.S. Pat. No. 10,919,259, which is a national stage application of International Application No. PCT/JP2014/082242, filed Dec. 5, 2014, and is based on and claims priority to Japanese Application No. 2013-252980, filed Dec. 6, 2013, the entire contents of each of these applications are incorporated herein by reference.

TECHNICAL FIELD

The present invention relates to a laminated substrate characterized by having excellent shapeability into a complicated shape at the time of stamping molding and being moldable particularly at a low mold temperature, and a method for manufacturing a molded product using this laminated substrate. More particularly, the invention relates to a laminated substrate which easily conforms to the molding of a three-dimensional shape such as a rib or a boss, and retains mechanical strength as a structural member, and which is an intermediate substrate made of a fiber-reinforced thermoplastic plastic that is suitably used for, for example, aircraft members, automobile members, and sports goods; and to a method for manufacturing the laminated substrate.

The present application claims priority on Japanese Patent No. 2013-252980 filed in Japan on Dec. 6, 2013, the disclosure of which is incorporated herein by reference.

BACKGROUND ART

Regarding a method for molding a fiber-reinforced thermoplastic plastic, stamping molding by which a substrate obtained by impregnating reinforcing fibers with a thermoplastic resin (prepreg substrate) is shaped into an intended shape by heating and pressing with a press or the like, is most generally carried out. A fiber-reinforced plastic molded product obtained thereby can be designed to have needed mechanical properties by setting the length and content of the reinforcing fiber to appropriate length and content. However, in a case in which the mold temperature is low, there is a problem that sufficient stamping moldability is not obtained, and shaping into a complicated shape such as a rib or a boss is insufficiently achieved. On the contrary, in a case in which the mold temperature is high, sufficient stamping moldability is obtained; however, there is a problem that solidification or crystallization within the mold occurs insufficiently, and significant deformation occurs after the molded product is taken out of the mold.

In order to solve this problem, there has been suggested a heating and cooling system of performing molding by heating the mold at a high temperature, subsequently cooling the mold, and taking out the molded product (Patent Documents 1 to 3). However, these systems require enormous equipment costs, and there is also a problem that there are restrictions on the mold shape.

Generally, in order to enhance the fluidity of fiber-reinforced thermoplastic plastics, it is considered effective to reduce the content of the reinforcing fibers, or to shorten the length of the reinforcing fibers. However, in this method, it is known that mechanical properties are also deteriorated, and it is difficult to obtain molded products having intended strength.

Furthermore, it is generally known that in order to enhance the fluidity of fiber-reinforced plastics, it is effective to decrease the viscosity of the matrix resin. However, it is known that the mechanical properties are deteriorated even in this method, and it is difficult to obtain molded products having intended strength.

Furthermore, it can be expected to enhance fluidity at low temperature by lowering the melting point or glass transition point of the matrix resin of a fiber-reinforced plastic. However, in this method, there is a problem that the mechanical properties at high temperature of a molded product are deteriorated.

CITATION LIST

Patent Document

Patent Document 1: JP 3977565 B1
Patent Document 2: JP 4121833 B1
Patent Document 3: JP 4242644 B1

SUMMARY OF THE INVENTION

Problem to be Solved by the Invention

The invention is intended to solve the problems associated with the prior art as described above, and it is an object of the invention to provide a laminated substrate which has excellent shapeability into a complicated shape at the time of stamping molding and can be molded at a particularly low mold temperature, and a method for manufacturing the laminated substrate.

Means for Solving Problem

The inventors of the invention conducted a thorough investigation, and as a result, the inventors found that the problems described above can be solved by the means described below, thus completing the invention. That is, the invention solves the problems described above by means of a laminated substrate in which a sheet-like material having a porosity of from 50% to 99% is laminated on at least one surface of a prepreg substrate that includes reinforcing fibers and a thermoplastic resin.

The gist of the invention lies in the following items [1] to [12].

[1] A laminated substrate, having a sheet-like material having a porosity of from 50% to 99% laminated on at least one surface of a prepreg substrate that includes reinforcing fibers and a thermoplastic resin.

[2] The laminated substrate according to the item [1], wherein the prepreg substrate is a prepreg laminated substrate in which plural sheets of prepregs each including the reinforcing fibers that are unidirectionally oriented and the thermoplastic resin, are laminated.

[3] The laminated substrate according to the item [1], wherein the prepreg substrate is a prepreg substrate in which fiber bundles of the reinforcing fibers or single fibers of the reinforcing fibers are dispersed in the thermoplastic resin.

[4] The laminated substrate according to the item [1], wherein the prepreg substrate is a prepreg substrate in which rectangular chips of a prepreg including the reinforcing fibers that are unidirectionally oriented, are dispersed in a random fashion.

[5] The laminated substrate according to any one of the items [1] to [4], wherein the length of the reinforcing fibers that constitute the prepreg substrate is 10 mm to 100 mm.

[6] The laminated substrate according to any one of the items [1] to [5], wherein the sheet-like material is a sheet formed from a thermoplastic resin.

[7] The laminated substrate according to any one of the items [1] to [5], wherein the sheet-like material is a sheet formed from inorganic fibers.

[8] The laminated substrate according to any one of the items [1] to [7], wherein the sheet-like material is a non-woven fabric.

[9] The laminated substrate according to any one of the items [1] to [6], wherein the sheet-like material is a foamed sheet.

[10] The laminated substrate according to any one of the items [1] to [9], wherein the thickness of the sheet-like material is from 0.01 mm to 10 mm.

[11] The laminated substrate according to any one of the items [1] to [10], wherein at least one surface of the prepreg laminated substrate is covered by the sheet-like material at a proportion of 30% by area or more relative to the total area of the at least one surface of the prepreg laminated substrate.

[12] The laminated substrate according to any one of the items [1] to [11], wherein the prepreg substrate and the sheet-like material are not adhered.

[13] The laminated substrate according to any one of the items [1] to [12], wherein the laminated substrate is a laminated substrate for stamping molding.

[14] A method for manufacturing a molded product of a laminated substrate, the method including (1) heating a prepreg substrate including reinforcing fibers and a thermoplastic resin, to a temperature higher than or equal to the melting point or the glass transition point of the thermoplastic resin that constitutes the prepreg, and then laminating a sheet-like material having a porosity of from 50% to 99% on at least one surface of the prepreg substrate, to thereby obtain a laminated substrate; or (2) laminating a sheet-like material having a porosity of from 50% to 99% on a prepreg substrate including reinforcing fibers and a thermoplastic resin on at least one surface of the prepreg substrate, and then heating the laminate thus obtained to a temperature higher than or equal to the melting point or the glass transition point of the thermoplastic resin that constitutes the prepreg, to thereby obtain a laminated substrate, the method subsequently including introducing the laminated substrate into a mold set to a temperature lower than or equal to the melting point or the glass transition point of the thermoplastic resin that constitutes the prepreg, and then stamping molding the laminated substrate.

[15] The manufacturing method according to the item [14], wherein the temperature of the mold is 50° C. to 200° C.

Effect of the Invention

According to the invention, a laminated substrate which has excellent shapeability into a complicated shape and can be molded particularly at a low mold temperature, and a method for manufacturing a molded product using this laminated substrate, can be obtained.

MODE(S) FOR CARRYING OUT THE INVENTION

Figure 1:
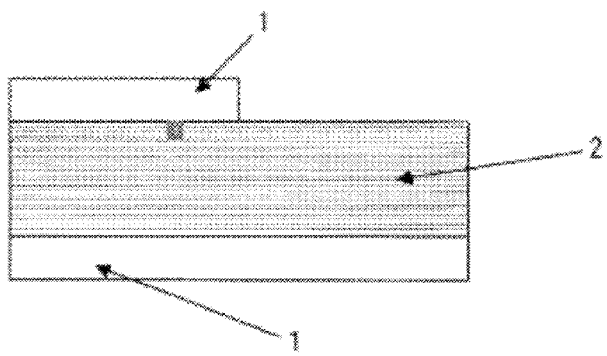
FIG. 1 is a diagram illustrating a laminated substrate having a sheet-like material having a porosity of from 50% to 99% laminated on both surfaces of a prepreg substrate of the invention.

A first exemplary embodiment of the invention relates to a laminated substrate in which a sheet-like material having a porosity of from 50% to 99% is laminated on at least one surface of a prepreg laminated substrate that includes reinforcing fibers and a thermoplastic resin.

Generally, in stamping molding of a prepreg substrate, an intended molded product is obtained by heating a prepreg substrate to a temperature higher than or equal to the melting point or the glass transition point of the thermoplastic resin using a heating facility such as an TR heater, subsequently inserting the prepreg substrate into a mold that is set to a temperature lower than or equal to the melting point or the glass transition point of the thermoplastic resin, and pressing the prepreg substrate under pressure. At that time, since the viscosity of the thermoplastic resin increases as a result of cooling through the mold surface, noticeable deterioration of stamping moldability occurs.

In order to prevent this cooling through the mold surface, it is preferable to provide a heat-insulating layer on the surface of the prepreg substrate that is brought into contact with the mold, and to maintain the temperature of the prepreg substrate at a high temperature. Also, it is preferable that this heat-insulating layer rapidly passes on, after shaping, the cooling through the mold to the prepreg substrate, so that solidification or crystallization proceeds sufficiently.

It is preferable that this heat-insulating layer is in a sheet form so as to cover a portion or the entirety of the prepreg substrate, is lightweight, and includes air since a sufficient heat-insulating effect is desired. According to the invention, from the viewpoint of having high heat insulation properties, it is preferable that at least one surface of a prepreg laminated substrate is covered by a sheet-like material having a porosity of from 50% to 99% at a proportion of 30% by area or more, more preferably 50% by area or more, relative to the total area of the at least one surface of the prepreg laminated substrate. More specifically, the coverage is 30% to 100% by area, and more preferably 50% to 100% by area.

(Sheet-Like Material Having Porosity of from 50% to 99%)

The porosity of the sheet-like material that is used as a heat-insulating layer is preferably from 50% to 99%, in order to retain sufficient heat insulation properties. Even more preferably, the porosity is preferably from 60% to 99%. Furthermore, the thickness of this sheet-like material is not particularly limited; however, it is more desirable if the sheet-like material is thinner, as long as the heat insulation properties can be maintained. The thickness is preferably from 0.01 mm to 10 mm, and more preferably from 0.05 mm to 5 mm. Meanwhile, the thickness of the sheet-like material can be measured by measuring the thickness of the sheet-like material at plural sites using vernier calipers or a micrometer, and determining the average value of the numbers.

Here, the porosity is a cumulative fraction occupied by the air phase in the total volume of the sheet-like material, and the porosity can be measured by the procedure: porosity (%)={1−(total volume of material constituting sheet-like material/total volume of sheet-like material)}×100.

It is preferable that this sheet-like material retains pores before stamping molding, and after stamping molding, the pores are lost. In order to do so, the sheet-like material is preferably a nonwoven fabric or a foamed sheet.

Furthermore, it is preferable that the prepreg substrate and the sheet-like material are not adhered before stamping molding. Here, "adhesion" means integration of the prepreg substrate and the sheet-like material by means of an adhesive or thermal fusion. Since the prepreg substrate and the sheet-like material are not adhered before stamping molding, heat insulation properties can be maintained, and since the prepreg and the sheet-like material are adhered after stamping molding, mechanical strength can be enhanced. Meanwhile, the porosity of the sheet-like material that has been stamping molded is preferably 0% to 2%, and more preferably 0% to 1%.

Regarding the fiber used for the nonwoven fabric, the kind of the fiber is not particularly limited, and inorganic fibers, resin fibers, plant fibers, metal fibers, or fibers of hybrid constitutions combining those fibers can be used. Examples of the inorganic fibers include carbon fibers, graphite fibers, silicon carbide fibers, alumina fibers, tungsten carbide fibers, boron fibers, and glass fibers. Examples of the resin fibers include aramid fibers, high-density polyethylene fibers, other general polypropylene fibers, nylon fibers, and polyesters. Examples of the plant fibers include cellulose fibers of hemp, jute, bamboo, and the like. Examples of the metal fibers include fibers of stainless steel, iron, and the like, and carbon fibers coated with metals may also be used. Among them, carbon fibers, glass fibers, polypropylene fibers, nylon fibers, and polyester fibers are preferred.

Regarding the resin used for the foamed sheet, the kind of the resin is not particularly limited as long as the resin is a thermoplastic resin, and a polyamide (nylon 6, nylon 66, or the like), a polyolefin (polyethylene, polypropylene, or the like), a modified polyolefin, a polyester (polyethylene terephthalate, polybutylene terephthalate, or the like), a polycarbonate, a polyamideimide, polyphenylene oxide, a polysulfone, a polyethersulfone, polyether ether ketone, polyetherimide, polystyrene, ABS, polyphenylene sulfide, a liquid crystal polyester, a copolymer of acrylonitrile and styrene, or the like can be used. Furthermore, mixtures of these polymers may also be used. Furthermore, a copolymerization product such as copolymerized nylon 6 and nylon 66 may also be used. Among them, a polyamide and a polyolefin are preferred. Also, if necessary, a flame retardant, a weather resistance improving agent, another oxidation inhibitor, a thermal stabilizer, an ultraviolet absorber, a plasticizer, a lubricating agent, a colorant, a compatibilizer, a conductive filler, and the like may be added to the resin.

(Prepreg Substrate Including Reinforcing Fibers and Thermoplastic Resin)

The prepreg substrate including reinforcing fibers and a thermoplastic resin used for the invention may be in any form, and examples thereof include a laminate of prepregs, a random dispersion of chopped prepregs, and a dispersion of fiber bundles of the aforementioned reinforcing fibers (hereinafter, also called fiber bundles or reinforcing fiber bundles) or single fibers of the aforementioned reinforcing fibers (hereinafter, also called single fibers) in a thermoplastic resin. These may be used in an intact state, or may be used after being fixed into a sheet shape by hot pressing.

Figure 3:
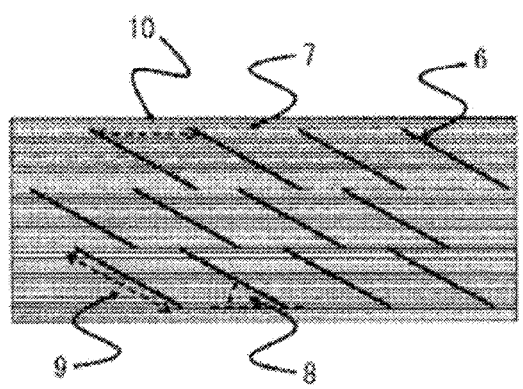
FIG. 3 is a diagram illustrating an example of the prepreg used in the invention.

The prepreg substrate produced by laminating prepregs may be a substrate in which prepregs having the reinforcing fibers unidirectionally oriented are unidirectionally laminated, a substrate in which prepregs are quasi-isotropically oriented, or a substrate in which prepregs are perpendicularly laminated; however, there is no particular reason to stick to a certain lamination method. Furthermore, the prepreg may have an incision having a depth that cuts the reinforcing fibers in a direction that traverses the length direction of the reinforcing fibers. In FIG. 3, straight line-shaped incisions are provided obliquely to the orientation direction of the reinforcing fibers; however, the incisions may also be provided perpendicularly. The shape of the incisions may be a linear shape, or may be a curved line shape. As the average fiber length of the reinforcing fibers produced at the time of incision is shorter, superior stamping moldability is obtained, and as the average fiber length is longer, superior mechanical properties are obtained. However, generally, the average fiber length is preferably from 10 mm to 100 mm in view of the balance between the two. Meanwhile, the average fiber length can be determined by measuring all of the cutting lengths (10 in FIG. 3) on a prepreg, and calculating the average value of the numbers. It is preferable that the incisions are formed such that the average fiber length is within the value range described above. Meanwhile, as illustrated in FIG. 3, the length 10 of a cut reinforcing fiber means the length from an incision to another incision. The sum total of the lengths 9 of incisions (hereinafter, also called cutting length) in 1 m$^2$ of a prepreg is preferably 20 m to 200 m, and more preferably 30 m to 150 m. The angle 8 formed by an incision 6 and a reinforcing fiber 7 is preferably 30° to 90°. Meanwhile, the angle 8 in a case in which the shape of the incisions is a curved line when viewed in a planar view can be measured, as the angle formed by a reinforcing fiber and an incision, in the same manner as in the case of a linear incision. In a case in which the prepreg substrate has incisions, it is preferable that the incisions cut the reinforcing fibers from the upper face to the lower face of the prepreg substrate. Furthermore, a thermoplastic resin layer may be included in all or some of the spaces between laminated prepregs. As the fiber volume percentage content (Vf) of the reinforcing fibers in the prepreg is smaller, superior stamping moldability is obtained, and as the fiber volume percentage content is larger, superior mechanical properties are obtained. However, generally, the fiber volume percentage content is preferably from 20% to 60% relative to the total volume of the prepregs, in view of the balance between the two. For the value of Vf as such, a value determined using the following formula, from the density ρc of the prepreg obtained by, for example, a water displacement method; the density ρf of the fibers obtained by a similar method; the mass W of the prepreg; and the weight W1 obtained after the prepreg is combusted and the resin is lost, is used.

$$Wf=(W-W1)\times 100/W \qquad \text{Formula (3)}$$

$$Vf=Wf\times \rho c/\rho f \qquad \text{Formula (4)}$$

In connection with rectangular prepreg chips, the random dispersion of chopped prepregs is preferably a product in which a prepreg in which reinforcing fibers are unidirectionally oriented is cut into rectangular-shaped pieces (chopped prepregs), and the prepreg pieces are dispersed in a random fashion. There are no particular limitations on the size of the rectangle produced at the time of cutting; however, it is preferable to cut the prepreg so as to obtain an average fiber length of from 10 mm to 100 mm, because excellent stamping moldability and mechanical properties are obtained. Furthermore, in order to disperse chopped prepregs in a random fashion, a smaller rectangular shape is preferred, and the length of one edge is preferably from 5 mm to 50 mm. As the fiber volume percentage content (Vf) of the reinforcing fibers in the prepreg is smaller, superior stamping moldability is obtained, and as the fiber volume percentage content is larger, superior mechanical properties are obtained. However, generally, the fiber volume percentage content is preferably from 20% to 60% relative to the total volume of the prepreg in view of the balance of the two.

In the dispersion of fiber bundles of reinforcing fibers or single fibers of reinforcing fibers in a thermoplastic resin, the fiber length is not particularly limited; however, from the viewpoint of achieving a balance between this fluidity and mechanical properties, the average fiber length of the reinforcing fibers is preferably from 1 mm to 20 mm. According to another embodiment, the average fiber length is preferably 10 mm to 100 mm. As the fiber volume percentage content (Vf) of the reinforcing fibers in the prepreg is smaller, superior stamping moldability is obtained, and as the fiber volume percentage content is larger, superior mechanical properties are obtained. However, generally, the fiber volume percentage content is preferably from 10% to 30% relative to the total volume of the prepreg, in view of the balance between the two.

Regarding the reinforcing fibers used for the prepreg substrate of the invention, the kind of the reinforcing fibers is not particularly limited, and inorganic fibers, resin fibers, plant fibers, metal fibers, or fibers having a hybrid constitution combining those fibers can be used. Examples of the inorganic fibers include carbon fibers, graphite fibers, silicon carbide fibers, alumina fibers, tungsten carbide fibers, boron fibers, and glass fibers. Examples of the resin fibers include aramid fibers, high-density polyethylene fibers, other general nylon fibers, and polyesters. Examples of the plant fibers include cellulose fibers of hemp, jute, bamboo, and the like. Examples of the metal fibers include fibers of stainless steel, iron, and the like, and carbon fibers coated with metals may also be used. Among these, in consideration of the mechanical characteristics such as strength of the final molded product, carbon fibers are preferable. Furthermore, average fiber diameter of the reinforcing fibers is preferably 1 μm to 50 μm, and more preferably 5 μm to 20 μm. Here, the diameter means the diameter of a cross-section produced when a reinforcing fiber is cut in a direction perpendicular to the length direction. The average fiber diameter can be measured by measuring plural fibers with a micrometer, and determining the average value of the numbers.

Regarding the resin used for the prepreg substrate of the invention, the kind of the resin is not particularly limited as long as the resin is a thermoplastic resin, and a polyamide (nylon 6, nylon 66, or the like), a polyolefin (polyethylene, polypropylene, or the like), a modified polyolefin, a polyester (polyethylene terephthalate, polybutylene terephthalate, or the like), a polycarbonate, a polyamideimide, polyphenylene oxide, a polysulfone, a polyethersulfone, polyether ether ketone, polyetherimide, polystyrene, ABS, polyphenylene sulfide, a liquid crystal polyester, a copolymer of acrylonitrile and styrene, or the like can be used. Furthermore, mixtures of these polymers may also be used. Among them, a polyamide and a polyolefin are preferred. Furthermore, a copolymerization product such as copolymerized nylon of nylon 6 and nylon 66 may also be used. Also, if necessary, a flame retardant, a weather resistance improving agent, another oxidation inhibitor, a thermal stabilizer, an ultraviolet absorber, a plasticizer, a lubricating agent, a colorant, a compatibilizer, a conductive filler, and the like may be added to the resin.

In regard to the prepreg substrate including reinforcing fibers and a thermoplastic resin, it is preferable that the reinforcing fibers are carbon fibers, and the thermoplastic resin is a modified polypropylene or a polyamide resin. The sheet-like material is preferably at least one selected from the group consisting of a polyester nonwoven fabric, a glass nonwoven fabric, and a foamed polyamide, and the porosity is preferably 90% to 95%.

In the following description, an embodiment of the method for manufacturing a molded product using a laminated substrate according to a second exemplary embodiment of the invention will be explained; however, the invention is not intended to be particularly limited thereby.

The second exemplary embodiment of the invention relates to a method for manufacturing a molded product of a prepreg laminated substrate, the method including: (1) heating a prepreg substrate including reinforcing fibers and a thermoplastic resin to a temperature higher than or equal to the melting point or the glass transition point of the thermoplastic resin that constitutes the prepreg, and then laminating a sheet-like material having a porosity of from 50% to 99% on at least one surface of the prepreg substrate, to thereby obtain a laminated substrate; or (2) laminating a sheet-like material having a porosity of from 50% to 99% on a prepreg substrate including reinforcing fibers and a thermoplastic resin on at least one surface of the prepreg substrate, and then heating the laminate thus obtained to a temperature higher than or equal to the melting point or the glass transition point of the thermoplastic resin that constitutes the prepreg, to thereby obtaining a laminated substrate, and the method subsequently including introducing the laminated substrate into a mold that is set to a temperature lower than or equal to the melting point or the glass transition point of the thermoplastic resin that constitutes the prepreg, and then stamping molding the laminated substrate.

The laminated substrate according to the first exemplary embodiment of the invention can be produced by a method for manufacturing a laminated substrate, the method including (1) heating a prepreg substrate including reinforcing fibers and a thermoplastic resin to a temperature higher than or equal to the melting point or the glass transition point of the thermoplastic resin that constitutes the prepreg, and then laminating a sheet-like material having a porosity of from 50% to 99% on at least one surface of the prepreg substrate, or (2) laminating a sheet-like material having a porosity of from 50% to 99% on a prepreg substrate including reinforcing fibers and a thermoplastic resin on at least one surface of the prepreg substrate, and then heating the laminate thus obtained to a temperature higher than or equal to the melting point or the glass transition point of the thermoplastic resin that constitutes the prepreg.

The temperature of the mold is preferably 50° C. to 200° C., and more preferably 100° C. to 180° C.

Stamping molding is to integrate the sheet-like material by heating and pressing. The pressure at the time of stamping molding is preferably 0.1 MPa to 10 MPa.

(Prepreg)

The prepreg used for the prepreg substrate of the invention can be obtained by, for example, preparing two sheets of a thermoplastic resin produced in a film form, inserting a reinforcing fiber sheet produced by arranging reinforcing fibers in a sheet form between the two sheets of the thermoplastic resin, and performing heating and pressing. More specifically, two sheets of a film formed from a thermoplastic resin are sent out from two rolls, a reinforcing fiber sheet supplied at the same time from a roll of the reinforcing fiber sheet is inserted between the two sheets of film, and then the assembly is heated and pressurized. Regarding the means for heating and pressurizing, any known means can be used, and two or more heat rolls may be utilized, or a means requiring a multistage process of using plural pairs of a preheating apparatus and a heat roll, or the like may also be employed. Here, the thermoplastic resin that constitutes the film is not necessarily of one kind, or a film formed from another kind of thermoplastic resin may be further laminated thereon using an apparatus such as described above.

The heating temperature may vary depending on the kind of the thermoplastic resin; however, usually, the heating temperature is preferably 100° C. to 400° C., and more preferably 150° C. to 350° C. On the other hand, the pressure at the time of pressurization is usually preferably 0.1 MPa to 10 MPa. When the pressure is in this range, it is preferable because a prepreg can be impregnated with a thermoplastic resin between the reinforcing fibers included in the prepreg. Furthermore, for the prepreg that can be used for the laminated substrate of the invention, a commercially available prepreg can also be used.

(Prepreg Laminated Substrate)

A prepreg laminated substrate is produced by laminating prepregs obtained as described above so as to attain unidirectional lamination, quasi-isotropic lamination, or perpendicular lamination, and regarding the prepreg laminated substrate of the invention, it is preferable to laminate 4 to 96 layers of prepregs. Furthermore, the prepreg may have incisions so as to cut the continuous fibers, by utilizing a laser marker, a cutting plotter, a punching die or the like.

(Random Prepreg Substrate)

The prepreg obtained as described above is processed into a tape shape having a narrow width using a slitter or the like, and then the prepreg is chopped into a certain length using a pelletizer, a guillotine cutter, a roller cutter or the like to obtain chopped prepregs. Regarding the method of dispersing chopped prepregs so as to obtain a random fiber direction, for example, a method of freely dropping chopped prepregs from a high position, and depositing the chopped prepregs on a container or the die of a mold, which passes over a belt conveyor; a method of generating an air stream by blowing air into the falling route; a method of providing baffle plates in the falling route; or a method of stirring deposited chopped prepregs and then disposing the chopped prepregs on a die, can be appropriately employed. In regard to the laminate described above, it is preferable that the number of laminations of the chopped prepregs is 2 to 100 layers.

(Fiber Bundle or Single Fiber-Dispersed Prepreg Substrate)

Regarding the method of satisfactorily dispersing fiber bundles of reinforcing fibers or single fibers of reinforcing fibers in a matrix resin, for example, the following method may be used. A method of cutting reinforcing fibers to a certain length using a guillotine cutter, a roller cutter or the like, also cutting a matrix resin, after spinning, into a fibrous form having a certain length, subsequently dispersing the two materials using a stirrer in a large amount of water, subsequently extracting water through a filter, and thereby uniformly dispersing the reinforcing fiber bundles in the matrix resin, can be employed. In the method described above, it is preferable that the weight concentration of the reinforcing fibers and the matrix resin in water is 1% or less relative to the total weight of the uniformly dispersed dispersion liquid (including water, the reinforcing fibers, and the matrix resin). Furthermore, at that time, the dispersion liquid may include an adhesive for bonding the reinforcing fiber bundles and the fibrous resin in water.

(Nonwoven Fabric)

In a case in which a nonwoven fabric is used as a heat-insulating layer on a portion or the entirety of the prepreg substrate surface obtained by the method described above, in order to produce the nonwoven fabric described above, for example, the following method may be used. A method of dispersing a fibrous material having an average fiber length of 5 mm to 100 mm in a random state by a carding method or an air-laid method to obtain a sheet form, and then bonding the fibers using spraying of an adhesive, thermal fusion, needle punching or the like, can be employed.

Furthermore, the nonwoven fabric that can be used for the laminated substrate of the invention, a commercially available nonwoven fabric can also be used.

(Foamed Sheet)

In a case in which a foamed sheet is used as a heat-insulating layer on a portion or the entirety of the prepreg substrate surface obtained by the method described above, in order to produce the foamed sheet, for example, the following method may be used. A method of obtaining a foamed sheet having an intended porosity by mixing thermoplastic resin pellets and a foaming agent, introducing the mixture into a sheet molding machine, and cooling the resin sheet foaming through a die exit using plural cooling rolls, can be employed.

Furthermore, regarding the foamed sheet that can be used for the laminated substrate of the invention, a commercially available foamed sheet can also be used.

(Method for Manufacturing Laminated Substrate)

The molded product of a laminated substrate according to the first exemplary embodiment of the invention can be produced by a manufacturing method, which includes (1) heating a prepreg substrate including reinforcing fibers and a thermoplastic resin to a temperature higher than or equal to the melting point or the glass transition point of the thermoplastic resin that constitutes the prepreg, and then laminating a sheet-like material having a porosity of from 50% to 99% on at least one surface of the prepreg substrate to thereby obtain a laminated substrate; or (2) laminating a sheet-like material having a porosity of from 50% to 99% on a prepreg substrate including reinforcing fibers and a thermoplastic resin on at least one surface of the prepreg substrate, and then heating the laminate thus obtained to a temperature higher than or equal to the melting point or the glass transition point of the thermoplastic resin that constitutes the prepreg to thereby obtain a laminated substrate, the method subsequently including introducing the laminated substrate into a mold that is set to a temperature higher than or equal to the melting point or the glass transition point of the thermoplastic resin that constitutes the prepreg, and then stamping molding the laminated substrate.

The heating temperature may vary depending on the kind of the thermoplastic resin; however, usually, the heating temperature is preferably a temperature higher by 10° C. to 100° C. than the Inciting point or the glass transition point. Furthermore, in a case in which the softening point of the sheet-like material is lower than the heating temperature, it is preferable to adopt the method described in item (1); and in a case in which the softening point of the sheet-like material is higher than the heating temperature, it is preferable to adopt the method of item (2). The mold temperature may vary depending on the kind of the thermoplastic resin; however, usually, the mold temperature is preferably a temperature lower by 0° C. to 200° C. than the inching point or the glass transition point. Furthermore, if the pressure at the time of stamping molding is high, as the pressure is higher, more satisfactory stamping moldability is obtained.

Therefore, the pressure applied to the molded product is usually preferably 0.1 MPa to 50 MPa.

The laminated substrate according to the first exemplary embodiment of the invention is preferably a laminated substrate for stamping molding. That is, the laminated substrate according to the first exemplary embodiment of the invention is preferably used as a material for manufacturing a molded product by stamping molding. The method for using the laminated substrate according to the first exemplary embodiment of the invention as a laminated substrate for stamping molding includes a step of inserting a laminated substrate into a mold and then applying pressure thereto; a step of cooling the laminated substrate by maintaining the laminated substrate therein for a certain period of time; and a step of taking out the laminated substrate.

The pressing force at the time of applying pressure is preferably 5 t to 500 t.

The time for applying pressure is preferably 10 seconds to 1800 seconds.

EXAMPLES

Hereinafter, the invention will be more specifically explained by way of Examples; however, the invention is not intended to be limited to the inventions described in Examples.

(Evaluation of Moldability)

Figure 2:
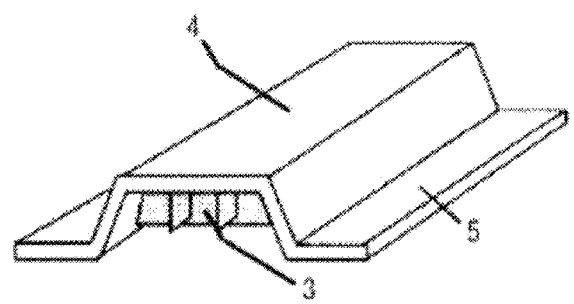
FIG. 2 is a diagram illustrating a molded product used in Examples of the invention.

Since the laminated substrate of the invention has satisfactory fluidity at the time of molding, the laminated substrate can be molded into various complicated shapes. Such fluidity can be evaluated such that, for example, when a laminated substrate is heated and then is pressed inside a mold having a complicated shape such as a rib, fluidity can be evaluated based on whether the laminated substrate has filled up to the tip of the rib. Specifically, a laminated substrate having a thickness of about 2 mm is cut out into a size of 380 mm×45 mm, and is maintained for a certain time inside an IR heater (manufactured by NGK Kiln Tech Corp.; product name: far-infrared heater type heating furnace). The laminated substrate is maintained for 60 seconds in a rib-attached hat channel die installed in a 300-t press (manufactured by Kawasaki Hydromechanics Corp.; product name: TMP2-300) at a pressing force of 75 t, and a molded product as illustrated in FIG. 2 was obtained. As a result, the case in which the laminated substrate had completely filled up to the tip of the rib was evaluated as ○, and the case in which the rib was not completely filled was evaluated as ×.

Example 1

Carbon fibers (manufactured by Mitsubishi Rayon Co., Ltd., product name: PYROFILL (registered trademark) TR-50S15E) were aligned into a planar form such that the directions of the reinforcing fibers would be a single direction, and thereby a reinforcing fiber sheet having a area weight of 72.0 g/m² was obtained. The two surfaces of this reinforcing fiber sheet were interposed between films made of an modified polypropylene resin (manufactured by Mitsubishi Chemical Corp., product name: MODIC (registered trademark) P958, area weight: 36.4 g/m²), the reinforcing fiber sheet was impregnated with the thermoplastic resin using calendar rolls. Thus, a prepreg having a fiber volume percentage content (Vf) of 33% and a thickness of 0.12 mm was obtained.

The prepreg thus obtained was cut out into a square which measured 300 mm on each side, and incisions were inserted at a constant interval as illustrated in FIG. 3 using a cutting plotter (manufactured by Laserck Corp., product name: L-2500). At that time, incision processing was performed, in which areas extending to the interior by 5 mm from the edges of the sheet were excluded, the reinforcing fibers had a constant length L of 25.0 mm and an average cutting length 1 of 42.4 mm, and the angle θ formed by a slit that cuts the fibers and a reinforcing fiber when viewed in a planar view was 45°.

Sixteen layers of prepregs having incisions inserted therein, which were obtained as described above, were superposed quasi-isotropically ([0/45/90/-45]s2), and the prepregs were spot-welded with an ultrasonic welding machine (manufactured by Emerson Japan, Ltd., product name: 2000LPt) to thereby produce a prepreg substrate.

The prepreg substrate obtained as such was disposed inside a mold cavity which measured 300 mm on each of four edges and had a depth of 1.5 mm, and the mold was maintained, using a compression molding machine (manufactured by Shinto Metal Industries Corp., product name: SFA-50HH0), for 7 minutes under the conditions of 220° C. and an oil pressure indication of 0 MPa with a high temperature side press. Subsequently, the mold was maintained for 7 minutes under the conditions of an oil pressure indication of 2 MPa (pressing pressure: 0.55 MPa) at the same temperature, and then the mold was transferred to a cooling press and maintained for 3 minutes at 30° C. and an oil pressure indication of 5 MPa (pressing pressure: 1.38 MPa). Thereby, an integrated prepreg substrate was obtained.

The prepreg substrate obtained as such was cut into four sheets each having a size of 380 mm×45 mm, and two sets of two sheets superposed together were heated for 5 minutes with an IR heater at 280° C. Thereafter, two sets of the heated prepreg substrates were superposed, and the resultant was disposed at the center of a polyester nonwoven fabric (manufactured by Takayasu Co., Ltd.; ARAFUNON NEEPUN C-100-107; porosity: 90%) having a size of 360 mm×100 mm at normal temperature such that the nonwoven fabric came under the prepreg substrates. Thus, a laminated substrate was produced Immediately thereafter, the laminated substrate was inserted into a rib-attached hat channel mold that was installed in a 300-t press and heated to 90° C. such that the nonwoven fabric was brought into contact with the upper surface of a lower mold, and the laminated substrate was pressured for 60 seconds at a pressing force of 75 t. Thus, a molded product was obtained.

The molded product obtained as such had a top panel 4, a rib part 3, and flange parts 4 as illustrated in FIG. 2. The molded product thus obtained had satisfactory surface gloss, and was filled with the laminated substrate up to the tips of the flange parts 5 and the rib part 3.

Example 2

The prepreg substrate obtained in the same manner as in Example 1 was cut out into four sheets each having a size of 380 mm×45 mm, and two sheets thereof were superposed to provide two sets. One set thereof was disposed at the center of a glass fiber nonwoven fabric (manufactured by Oribest Co., Ltd.; GRABESTOS FBP-025; porosity: 95%) cut out into a size of 380 mm×90 mm such that the nonwoven fabric came under the prepreg substrate. Thus, a laminated substrate was produced. Those were heated for 5 minutes with an IR heater at 280° C., and then one set without the nonwoven fabric was disposed on the nonwoven fabric-attached set, and immediately thereafter, the assembly was inserted into a rib-attached hat channel mold that was installed in a 300-t press and heated to 80° C. such that the nonwoven fabric was brought into contact with the upper surface of a lower mold, and the laminated substrate was pressured for 60 seconds at a pressing force of 75 t.

The molded product obtained as such had satisfactory surface gloss, and was filled with the laminated substrate up to the tip of the rib.

Comparative Example 1

A laminated substrate was produced in the same manner as in Example 1, except that the prepreg substrate was heated and pressed in the same manner as in Example 1, but a polyester nonwoven fabric was not used. Thus, a molded product was obtained. The molded product obtained as such had satisfactory surface gloss, but a portion of the rib tip was not filled with the laminated substrate.

Comparative Example 2

A laminated substrate was produced in the same manner as in Example 1, except that the laminated substrate was heated and pressed in the same manner as in Example 1, but a low-foamed polypropylene sheet (manufactured by Mitsui Chemical Tohcello, Inc.; HOPPOTO; porosity: 30%) was used instead of the polyester nonwoven fabric. Thus, a molded product was obtained.

The molded product obtained as such had satisfactory surface gloss; however, a portion of the rib tip was not filled with the laminated substrate.

Comparative Example 3

A laminated substrate was produced in the same manner as in Comparative Example 1, without using a polyester nonwoven fabric, and the laminated substrate was heated with an IR heater and was subjected to stamping molding at a mold temperature of 130° C.

The molded product obtained as such had no surface gloss, gas retention occurred at the rib tip, and the filling was insufficiently achieved.

Example 3

Carbon fibers (manufactured by Mitsubishi Rayon Co., Ltd., product name: PYROFILL (registered trademark) TR-50S15L) were aligned unidirectionally in a planar form, and thereby a reinforcing fiber sheet having a area weight of 72.0 g/m² was obtained. The two surfaces of this reinforcing fiber sheet were interposed between films made of a polyamide resin (nylon 6, manufactured by Ube Industries, Ltd., product name: 1013B) and having a area weight of 45.6 g/m², the fiber sheet was impregnated with the thermoplastic resin using calendar rolls. Thus, a prepreg having a fiber volume percentage content (Vf) of 33% and a thickness of 0.12 mm was obtained. This prepreg was subjected to incision processing such that the reinforcing fibers had a constant length L of 25.0 mm and an average cutting length l of 42.4 mm, and the angle θ formed by a slit that cut the fibers and a reinforcing fiber when viewed in a planar view was 45°. A laminated substrate and a molded product thereof were produced in the same manner as in Example 1 using a polyester nonwoven fabric, except that the set temperature of the IR heater was adjusted to 320° C., the heating time was set to 10 minutes, and the set temperature of the rib-attached hat channel mold was set to 120° C. Thus, the stamping moldability was evaluated.

As a result, a molded product which had satisfactory surface gloss and was filled with the laminated substrate up to the tip of the rib, was obtained.

Example 4

A laminated substrate was produced in the same manner as in Example 2 using a glass nonwoven fabric and using the prepreg substrate obtained in the same manner as in Example 3, and the laminated substrate was heated and pressed under the conditions similar to those of Example 3. Thereby, stamping moldability was evaluated. As a result, a molded product which had satisfactory surface gloss and was filled with the laminated substrate up to the tip of the rib was obtained.

Example 5

A laminated substrate was produced in the same manner as in Example 3, except that a nylon foamed sheet (manufactured by Inoac Corp.; trade name: ZOTEK NB-50; porosity: 95%) was used instead of the polyester nonwoven fabric, and stamping moldability was evaluated under the conditions similar to those of Example 3. As a result, a molded product filled with the laminated substrate up to the tip of the rib was obtained.

Example 6

A laminated substrate was produced in the same manner as in Example 4 using a glass nonwoven fabric. Then, stamping moldability was evaluated in the same manner as in Example 4, except that the glass nonwoven fabric was disposed on both sides of the prepreg substrate, and the laminated substrate was subjected to stamping molding after heating with an IR heater. As a result, a molded product filled with the laminated substrate up to the tip of the rib was obtained.

Comparative Example 4

A prepreg substrate was produced in the same manner as in Example 3, and a molded product was obtained by heating the prepreg substrate with an IR heater but performing stamping molding without using a nonwoven fabric. Stamping moldability was evaluated. As a result, the surface gloss was satisfactory, but filling of the rib was insufficiently achieved.

Example 7

The prepreg obtained in Example 1 was cut into a chip shape which measured 25 mm in the fiber direction and 15 mm in a direction perpendicular to the fiber direction, using a cutting plotter (manufactured by Laserck Corp., product name: L-2500), and thus chopped prepregs were obtained. 220 g of the chopped prepregs were freely dropped from a height of 1500 mm, and thereby the chopped prepregs were deposited inside a mold cavity which measured 300 mm on each side and 1.5 mm in depth. Subsequently, the mold was maintained, using a compression molding machine (manufactured by Shinto Metal Industries Corp., product name: SFA-50HH0), for 7 minutes under the conditions of 220° C. and an oil pressure indication of 0 MPa with a high temperature side press. Subsequently, the mold was maintained for 7 minutes under the conditions of an oil pressure indication of 2 MPa (pressing pressure: 0.55 MPa) at the same temperature, and then the mold was transferred to a cooling press and maintained for 3 minutes at 30° C. and an oil pressure indication of 5 MPa (pressing pressure: 1.38 MPa). Thereby, an integrated prepreg substrate was obtained. Using this prepreg substrate, a laminated substrate was produced in the same manner as in Example 2 using a glass nonwoven fabric, and the laminated substrate was subjected to heating and stamping molding. Thus, a molded product was obtained, and stamping moldability thereof was evaluated. The molded product obtained as such had satisfactory surface gloss and was filled with the laminated substrate up to the tip of the rib.

Example 8

Carbon fibers (manufactured by Mitsubishi Rayon Co., Ltd., product name: PYROFILL (registered trademark) TR-50S15L) were cut to a fiber length of 6 mm using a roller cutter. Furthermore, an modified polypropylene resin film (manufactured by Mitsubishi Chemical Corp., product name: MODIC (registered trademark) P958) was processed into a non-continuous fibrous form having a fiber length of 3 mm. 356 g of these carbon fiber bundles and 724 g of the resin fiber bundles were introduced into 100 L of water, and the mixture was stirred for 10 seconds with a stirrer. Water was removed, the solids were dried, and thus a mat-like material having a area weight of 2,000 g/m$^2$ was obtained. 220 g of this mat-like material was inserted into a mold cavity which measured 300 mm on each side and 1.5 mm in depth. Subsequently, the mold was maintained, using a compression molding machine (manufactured by Shinto Metal Industries Corp., product name: SFA-50HH0), for 7 minutes under the conditions of 220° C. and an oil pressure indication of 0 MPa with a high temperature side press. Subsequently, the mold was maintained for 7 minutes under the conditions of an oil pressure indication of 2 MPa (pressing pressure: 0.55 MPa) at the same temperature, and then the mold was transferred to a cooling press and maintained for 3 minutes at 30° C. and an oil pressure indication of 5 MPa (pressing pressure: 1.38 MPa). Thereby, an integrated prepreg substrate was obtained. Using this prepreg substrate, a laminated substrate was produced in the same manner as in Example 2 using a glass nonwoven fabric. The laminated substrate thus obtained was subjected to heating and stamping molding, and thus a molded product was obtained. The molded product obtained as such had satisfactory surface gloss and was filled with the laminated substrate up to the tip of the rib.

In the Table, the abbreviation "PP" means polypropylene, and the abbreviation "PA6" means a polyamide resin.

In regard to the evaluation items for surface gloss, a molded product which had a smooth surface with gloss was rated as "○"; and a molded product which had a rough surface and did not show gloss was rated as "×". In regard to the evaluation items for rib filling, a molded product which was filled up to the tip was rated as "○"; and a molded product which was not filled to the tip was rated as "×".

The evaluation results are indicated in Table 1 together.

TABLE 1

|  | Thermoplastic resin | Heat-insulating layer | Porosity | Surface gloss | Rib filling | Moldability |
| --- | --- | --- | --- | --- | --- | --- |
| Example 1 | Modified PP | Polyester nonwoven fabric | 90% | ○ | ○ | ○ |
| Example 2 | Modified PP | Glass nonwoven fabric | 95% | ○ | ○ | ○ |
| Comparative Example 1 | Modified PP | None | — | ○ | × | × |
| Comparative Example 2 | Modified PP | Low-foamed PP | 30% | ○ | × | × |
| Comparative Example 3 | Modified PP | None | — | × | × | × |
| Example 3 | PA6 | Polyester nonwoven fabric | 90% | ○ | ○ | ○ |
| Example 4 | PA6 | Glass nonwoven fabric | 95% | ○ | ○ | ○ |
| Example 5 | PA6 | Foamed PA6 | 95% | ○ | ○ | ○ |
| Example 6 | PA6 | Glass nonwoven fabric | 95% | ○ | ○ | ○ |
| Comparative Example 4 | PA6 | None | — | ○ | × | × |
| Example 7 | Modified PP | Glass nonwoven fabric | 95% | ○ | ○ | ○ |
| Example 8 | Modified PP | Glass nonwoven fabric | 95% | ○ | ○ | ○ |

DISCUSSION

From the above results, it was found that according to the invention, a laminated substrate having excellent shapeability into a complicated shape and having excellent moldability particularly at a low mold temperature, can be provided. It was found that due to the low mold temperature, warpage caused by post-molding shrinkage is reduced, and a molded product having satisfactory surface characteristics is obtained. Also, it was found that since the laminated substrate has high porosity, gas retention at the time of stamping molding can be suppressed; that handling during transferring from a heating process to stamping molding can be easily achieved by adding functions to the sheet-like material; and that the adhesive strength upon adhesion is increased by using a sheet-like material having excellent adhesiveness.

INDUSTRIAL APPLICABILITY

According to the invention, a laminated substrate which has excellent shapeability into a complicated shape and is moldable particularly at a low mold temperature, and a method for manufacturing the laminated substrate, can be obtained.

EXPLANATIONS OF LETTERS OR NUMERALS

1: Sheet-like material having porosity of from 50% to 99%
2: Prepreg substrate including reinforcing fibers and thermoplastic resin
3: Rib part
4: Top panel (laminated substrate-charged part)
5: Flange part
6: Incision
7: Reinforcing fiber
8: Angle formed by incision and reinforcing fiber
9: Cutting length
10: Length of cut reinforcing fiber

The invention claimed is:

1. A method for manufacturing a molded product of a laminated substrate, the method comprising:
   (1) heating a prepreg substrate including reinforcing fibers and a thermoplastic resin to a temperature higher than or equal to the melting point or the glass transition point of the thermoplastic resin that constitutes the prepreg, and then laminating a sheet material having a porosity of from 50% to 99% on at least one surface of the prepreg substrate to thereby obtain a laminated substrate, or (2) laminating a sheet material having a porosity of from 50% to 99% on a prepreg substrate including reinforcing fibers and a thermoplastic resin on at least one surface of the prepreg substrate, and then heating the laminate thus obtained to a temperature higher than or equal to the melting point or the glass transition point of the thermoplastic resin that constitutes the prepreg to thereby obtain a laminated substrate,
   the method subsequently comprising introducing the laminated substrate into a mold that is set to a temperature lower than or equal to the melting point or the glass transition point of the thermoplastic resin that constitutes the prepreg, and then stamping molding the laminated substrate.

2. The manufacturing method according to claim 1, wherein the temperature of the mold is 50° C. to 200° C.

3. The manufacturing method according to claim 1, wherein the prepreg substrate is a prepreg laminated substrate in which plural sheets of a prepreg including reinforcing fibers that are unidirectionally oriented and the thermoplastic resin, are laminated.

4. The manufacturing method according to claim 1, wherein the prepreg substrate is a prepreg substrate in which fiber bundles of the reinforcing fibers or single fibers of the reinforcing fibers are dispersed in the thermoplastic resin.

5. The manufacturing method according to claim 1, wherein the prepreg substrate is a prepreg substrate in which rectangular chips of a prepreg including reinforcing fibers that are unidirectionally oriented, are dispersed in a random fashion.

6. The manufacturing method according to claim 1, wherein the sheet is a sheet formed from a thermoplastic resin.

7. The manufacturing method according to claim 1, wherein the sheet is a sheet formed from inorganic fibers.

8. The manufacturing method according to claim 1, wherein the sheet is a nonwoven fabric.

9. The manufacturing method according to claim 1, wherein the sheet is a foamed sheet.

10. The manufacturing method according to claim 1, wherein a thickness of the sheet is from 0.01 mm to 10 mm.

11. The manufacturing method according to claim 1, wherein the at least one surface of the prepreg substrate is covered by the sheet material at a proportion of 30% by area or more relative to a total area of the at least one surface of the prepreg substrate.

12. The manufacturing method according to claim 1, wherein the sheet is a selected from the group consisting of polyester nonwoven fabric, glass nonwoven fabric, and foamed polyamide resin.

13. The manufacturing method according to claim 1, wherein a part of the at least one surface of the prepreg substrate is exposed.

14. The manufacturing method according to claim 1, wherein the sheet is a non-impregnated sheet.

15. The manufacturing method according to claim 1, wherein the reinforcing fibers comprise carbon fiber or glass fiber.

16. The manufacturing method according to claim 1, wherein the thermoplastic resin comprises a polyamide, a polyolefin, a modified polyolefin, a polyester, a polycarbonate, a polyamideimide, polyphenylene oxide, a polysulfone, a polyethersulfone, a polyether ether ketone, a polyetherimide, a polystyrene, an ABS, or a polyphenylene sulfide.

17. The manufacturing method according to claim 1, wherein the sheet material has a porosity of from 90% to 99%.

* * * * *